United States Patent [19]
Fleming

[11] 3,802,022
[45] Apr. 9, 1974

[54] LITTER PICKUP VEHICLE

[76] Inventor: Jerry A. Fleming, 324 145th Pl. Northeast, Bellevue, Wash. 98007

[22] Filed: Apr. 12, 1971

[21] Appl. No.: 133,204

[52] U.S. Cl. ............................ 15/84, 56/9, 56/12.9, 56/228, 56/328 R, 56/379, 214/509, 214/522
[51] Int. Cl. ................................................ E01h 1/04
[58] Field of Search ........................ 15/81–87, 49 C, 15/50 C, 340; 171/115, 116, 130; 198/7 BL, 9; 56/328 R, 9, 12.9, 228, 379; 214/509, 522; 37/8

[56] References Cited
UNITED STATES PATENTS

| | | | |
|---|---|---|---|
| 1,239,293 | 9/1917 | Murphy | 15/84 |
| 2,916,753 | 12/1959 | Redpath et al. | 15/84 |
| 3,447,179 | 6/1969 | Copeland | 15/84 X |
| 3,493,136 | 2/1970 | Spellman, Jr. | 214/522 |
| 3,591,948 | 7/1971 | Brumbaugh | 56/328 R |

FOREIGN PATENTS OR APPLICATIONS

| | | | |
|---|---|---|---|
| 1,272,327 | 7/1968 | Germany | 15/340 |

*Primary Examiner*—Edward L. Roberts
*Attorney, Agent, or Firm*—Robert P. Auber; George P. Ziehmer; Harries A. Mumma, Jr.

[57] ABSTRACT

A mechanism adapted to be mounted upon a vehicle for picking up litter from the vehicle supporting surface while traversing the surface at a fairly rapid rate. The mechanism includes an articulated arm adapted to be stored on top of the vehicle during travel or to be extended alongside of the vehicle while in operation. The arm includes at its outer end a litter pickup head including mechanism adapted to readily pick up the majority of litter commonly found. The arm further includes conveyor means mounted upon and conforming to the arm to carry the litter picked up by the head to a litter container mounted on the moving vehicle. The litter pickup head is designed to travel along the supporting surface and pick up litter that comes in contact with the head. The position of the head as well as its operation is fully controlled from inside the cab of the vehicle whereby the operator may seek out and capture litter within the range of the arm.

18 Claims, 13 Drawing Figures

INVENTOR.
JERRY A. FLEMING

BY Leed, Berry, Dowrey & Cross

ATTORNEYS

INVENTOR.
JERRY A. FLEMING
BY Leed, Berry, Dowrey & Cross
ATTORNEYS

INVENTOR.
JERRY A. FLEMING
BY Seed, Berry, Dowrey & Cross
ATTORNEYS

LITTER PICKUP VEHICLE

BACKGROUND OF THE INVENTION

One of the most time consuming and wasteful uses of manpower in the present society is the energy and manpower expended in picking up the waste material discarded by the populace along the highways and beaches. One of the areas wherein it is exceedingly costly to pickup waste materials is along the highways. People traveling along the highways discard such things as beer bottles and the like instead of carrying them to an appropriate depository.

In the past the litter along the highways has been picked up by means of a combination of a dump truck and two or three men who sequentially pitch the litter from the highway into the truck which then hauls the litter to an appropriate dump and deposits it to be buried or the like. It is obvious that this method of picking up litter consumes many man hours per amount of litter collected and upon areas of the roadway where there is not a large accumulation of litter, just the time it takes for the man to walk from one piece of litter to another and then transport it to the truck is time consuming.

It is to be noted at this point that a man can usually walk three to four miles an hour but because of the nature of the job the men who are picking up litter along the sides of the highways are less than enthusiastic and probably walk at a much slower pace. Further, because of working regulations controlling in most situations, the men who are picking up litter are entitled to rest periods, lunch periods and travel time to the place at which they are to resume picking up the litter. All of these things reduce the efficiency of the present litter picking method even more than hereinabove noted.

Another area where litter becomes a problem and is expensive to remove is along the seashore and in the harbors. The users of our waterways appear to be as inconsiderate as the users of our highways to the result that the litter is unsightly as well as dangerous.

One of the methods currently in use for absorbing oil from accidental spills is the use of straw. Once the oil is absorbed, it becomes a problem as to how to pick up the saturated straw which becomes just another form of litter if not removed and thus ecologically damaging.

With the above noted problems in mind it is an object of the present invention to provide a mechanism whereby litter can be picked up at a much more rpaid rate than presently possible thus enabling the cleaning of a much greater area.

It is another object of the present invention to provide a mechanism which is controlled as to lateral position by an operator and will automatically pick up the majority of the litter normally discharged in inappropriate places.

Still another object of the present invention is to provide a pickup head which, under the control of an operator, has the capability of either urging material captured by the head rearward onto the conveyor belt or forward out of the head.

It is a further object of the present invention to provide a litter pickup device which is easily transportable from place to place in that it is completely self storing on the vehicle and can quickly and easily be moved from the stored to the operative position or vice versa.

It is likewise an object of the present invention to provide a litter pickup mechanism which is completely controlled by an operator within the vehicle and is likewise observable in all of its operations by the same operator.

DETAILED DESCRIPTION OF THE DRAWINGS

Figure 1:
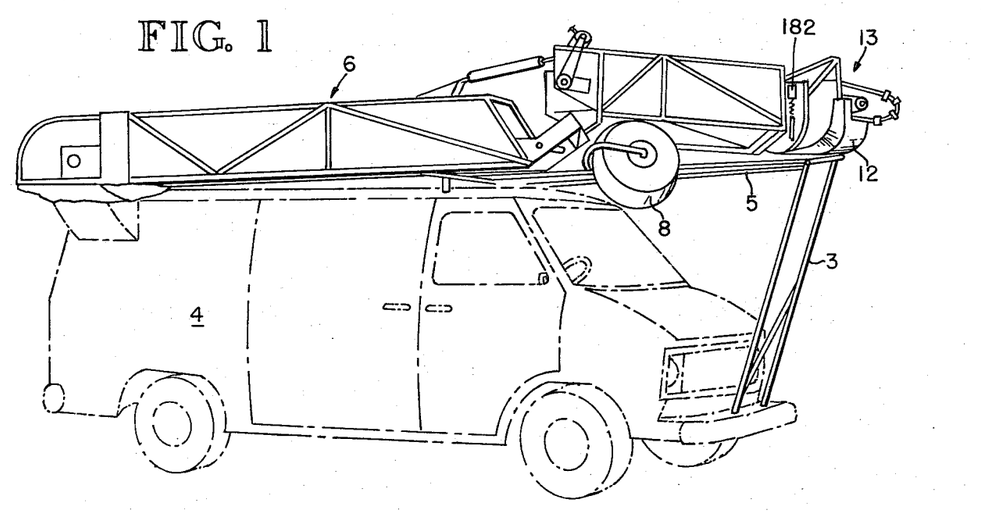
FIG. 1 is a perspective view of the inventive mechanism in the stored position upon a mobile van.

As can be seen in FIG. 1 the litter pickup mechanism is adapted to be self storing and is shown in this embodiment mounted upon a van type truck although the invention is in no way intended to be limited to this embodiment. In the preferred embodiment the van is of a standard configuration with the exception of the fact that the control mechanisms such as steering wheel and the like are mounted on the righthand portion of the cab such that the operator may drive down the righthand side of the road and observe the litter pickup mechanism, as described hereinafter, in operation. The controls to be described in detail hereinafter for the litter pickup mechanism comprises a single lever, such as a modified joy stick for an airplane, which is mounted adjacent the operator such that he may control the entire litter pickup mechanism with one hand and not interfere with the driving of the vehicle.

Figure 2:
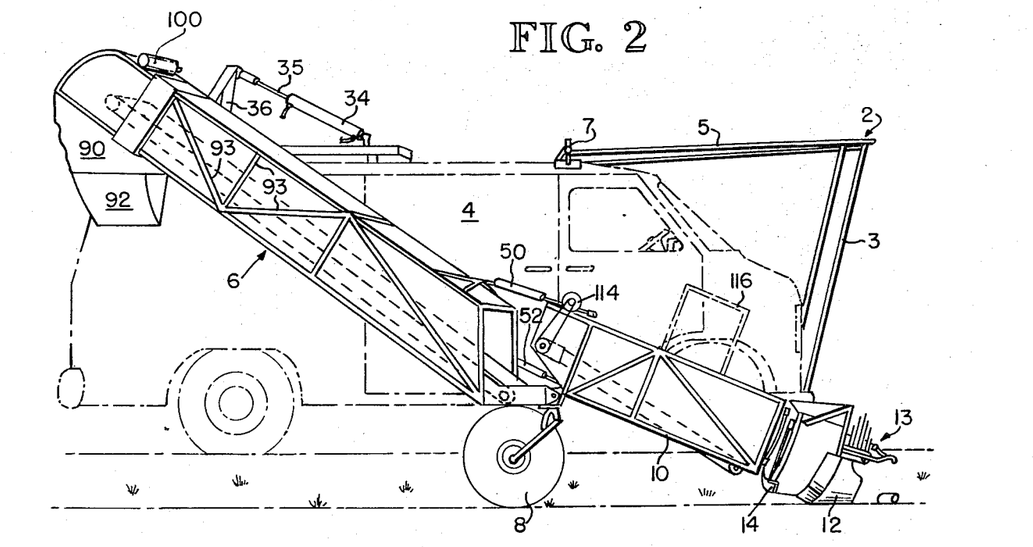
FIG. 2 is an elevation view of the vehicle in FIG. 1 with the pickup mechanism in the operative position.
Figure 3:
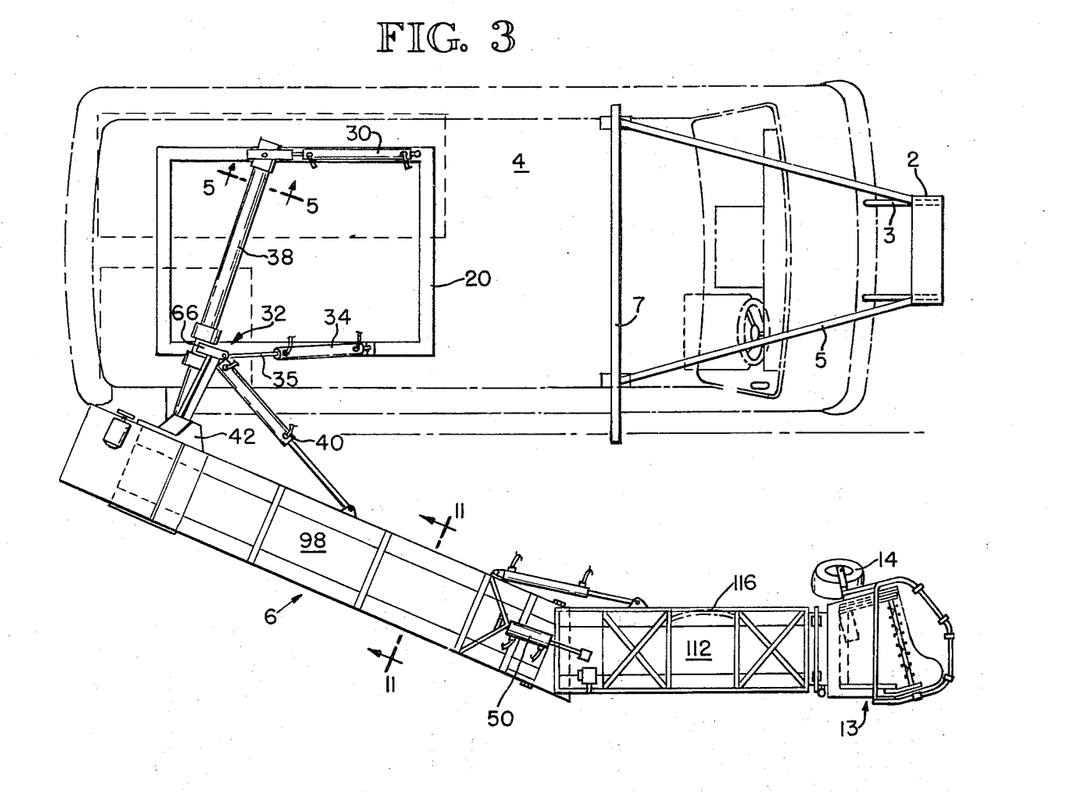
FIG. 3 is a plan view of the vehicle of FIG. 1 illustrating the storage and operative mechanism.

The preferred embodiment of the litter pickup mechanism is shown in general views 1 through 3, wherein it can be seen that as mounted upon a van type vehicle it is self storing in a position above the roof. The front portion of the pickup mechanism is supported when stored by rack 2 which has downwardly depending legs 3 mounted on the bumper and forwardly extending braces 5 which are secured to rack 2 at the front end and terminate on a lateral roof rack 7 on top of the front of van 4. The pickup mechanism itself comprises a two-piece articulated conveyor, the upper portion 6 being attached at its upper end to the top of the vehicle and its lower end adapted to ride upon wheel 8 when in use. The lower section or conveyor portion 10 is adapted for swinging motion relative to the upper portion and is designed to move along the supporting surface by a combination of a skid 12 on the bottom of the pickup head 13 and a wheel 14. When the pickup mechanism is moved to its self storing position the front portion of conveyor section 6 rests upon rack 7 and the front portion of conveyor 10 rests upon rack 2.

The rear portion of the top of the vehicle 4 includes a generally rectangular shaped frame 20 which is designed to support the rear portion of the conveyor 6 both during the pickup operation as well as during the time the litter pickup mechanism is stored on top of the vehicle. It is to be understood that the pickup mechanism is designed to be carried on top of the vehicle when it is traveling from place to place thus allowing rapid transport.

The rectangular frame 20 likewise serves as a support or base for two of the cylinders which control the position of the litter pickup mechanism and serve to raise the entire mechanism to the self storing position. The position of the pickup mechanism, as described in greater detail hereinafter, is controlled by cylinders 30 and 34. When actuated, cylinder 30 causes the entire pickup assembly to pivot about point 32 on the opposite side of the vehicle thus controlling the distance to which the arm extends outwardly from the side of the vehicle and likewise allowing the assembly to be returned to the stored position. Cylinder 34 is connected to a lever arm or mast 66 which is rigidly secured to a cylindrical member 38 which in turn is rigidly secured to the uppermost portion of the upper conveyor 6. Cylinder 34 is used to rotate the conveyor about the arm of the shaft 38, thereby controlling the relative height of the outboard end of the conveyor. Pneumatic rams 30 and 34 are thus used to return the litter pickup mechanism to its stored position for traveling from place to place as shown in FIG. 1 as well as providing the basic position control for the conveyor.

Although the ram 30 is adequate to pivot the mechanism about point 32 from the stored position to a position where it will clear the side of the vehicle when lowered it does not provide sufficient movement to allow the mechanism to sweep a large area. In order to give the pickup mechanism a larger area of pickup capabilities another ram 40 is located between the mast 66, rigidly mounted to the shaft 38 and the inboard side of the upper conveyor 6. Actuation of the ram 40 causes the conveyor to pivot about point 42 which is located at the outboard end of a cylindrical support structure 38.

Figures 10, 11, 12:
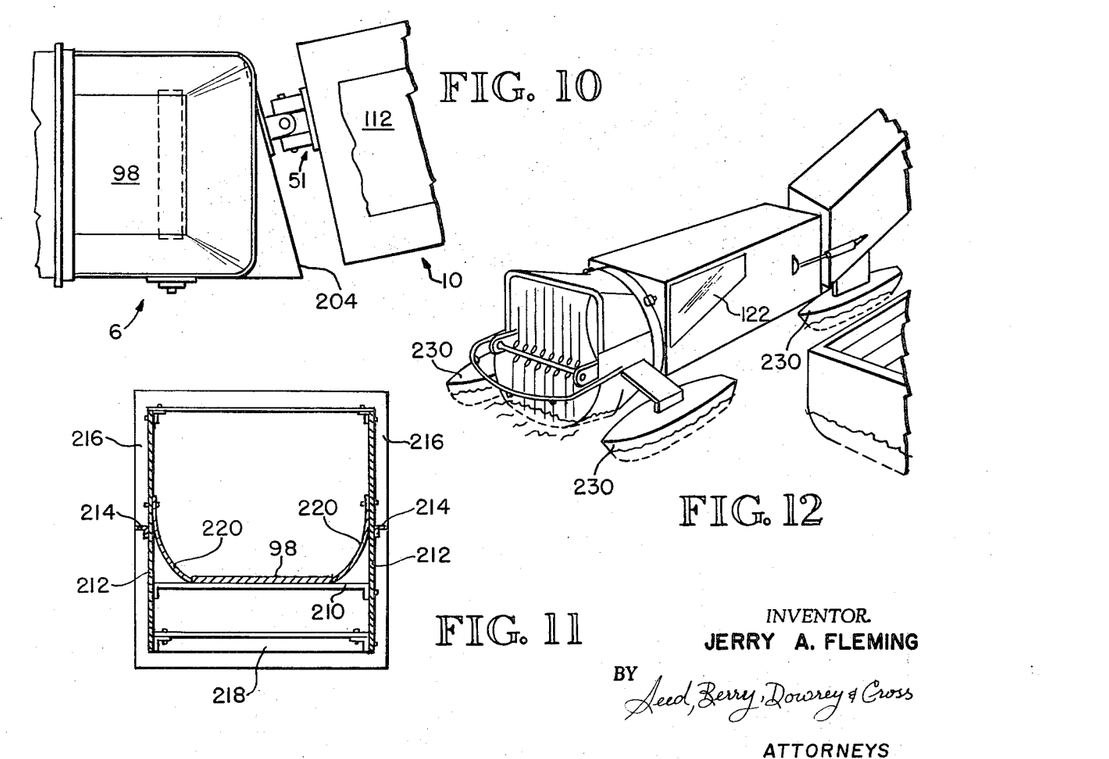
FIG. 10 is a section of view along lines 10—10 of FIG. 9.
FIG. 11 is a section along lines 11—11 of FIG. 3.
FIG. 12 is a perspective of the mechanism in operation upon water.

The lower end of the conveyor structure 10 is articulated with respect to the upper conveyor structure 6 allowing the two elements to be placed in a manner that the head approaches the litter in the most appropriate orientation. The vertical position of the lowermost section 10 is controlled by ram 50 causing pivotal movement about a universal joint 51 as seen in FIG. 10. Ram 52 controls the horizontal position likewise causing the section to pivot about the universal joint seen in FIG. 10 and described hereinafter.

In operation, as the vehicle is traveling from place to place to gather litter, the entire mechanism will be stored upon the roof of the vehicle as shown in FIG. 1. Upon reaching the place where it is necessary to pick up litter along the highway or other supporting surface the ram 34 will be actuated thus lifting the entire litter picking mechanism up off the supports 7 and 2 on the roof of the vehicle. Once the litter pickup mechanism is clear of the roof supports, ram 30 is actuated causing the entire structure to pivot about point 32 thus swinging outwardly alongside the vehicle at which time ram 34 is vented allowing the weight of the structure to lowere to the supporting surface until wheel 8 is in contact therewith. The downward movement of the conveyor will cause the ram of cylinder 34 to move causing hydraulic flow within the system thus causing ram 50 which is in series with ram 34 to contract lifting the forward end 10 of the conveyor upward assuring that wheel 8 will be the first portion to contact the ground. Having the system operate in this fashion greatly reduces the possibility of damaging the pickup head. The lateral position of the upper conveyor 6 is then controlled by ram 40 which as noted above causes the conveyor to pivot about point 42 at the end of cylindrical member 38. Following contact of wheel 8 with the supporting surface the ram 50 is vented allowing the front or lower portion 6 of the conveyor to drop to the supporting surface with the skid 12 and wheel 14 in contact therewith. During operation, the horizontal position of the outboard end of the conveyor section 10 and the attached head 13 is controlled by operation of double acting ram 52.

Figure 4:
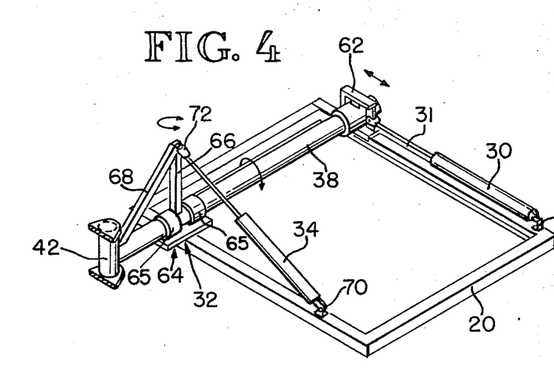
FIG. 4 is an enlarged perspective view of the storage and operative apparatus as shown on the top of the van.

Referring now to FIG. 4 the mounting of the litter pickup mechanism with respect to the frame member 20 may most readily be seen. One end of cylinder 30 is secured to the forward end of the framework at 60 whereas the other end, ram 31, is secured to a rectangular bracket 62 hereinafter described in detail. Actuation of the ram 30 causes the bracket 62 to move toward or away from the cylinder 30 and, since one end of the cylindrical member 38 is secured to rectangular bracket 62, similarly causes the end of shaft 38 to move toward or away from the cylinder. The other end of cylindrical member 38 is journaled in a trunnion 64, having two sections 65, which is pivoted to the framework 20 at 32. Extending upwardly from cylindrical member 38 at a point intermediate the two portions of trunnion 64 there is a lever arm or mast 36 having an angled brace member 68 extending from the upper portion of lever arm 36 to the outer end of cylindrical member 38. One end of cylinder 34 is secured to the frame 20 as at 70 and the outboard end is secured to the upper end of lever arm 36 at 72. Actuation of cylinder 34 causes the upper end of lever arm 36 to move toward or away from the cylinder thus causing a cylindrical member 38 to rotate within the trunnion 64.

Figure 5:
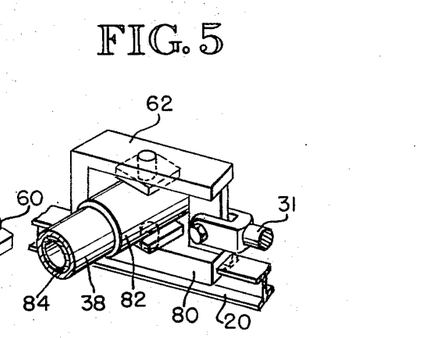
FIG. 5 is an enlarged view of a portion of the mechanism of FIG. 4.

FIG. 5 is an enlarged detail of the rectangular bracket 62 showing its attachment to the frame 20 as well as to the cylindrical rod 38. Referring to this Fig. it can be seen that the rails of the bracket 20 are of an I configuration in cross section. The bottom portion 80 of rectangular bracket 62 is of a complimentary shape such that it will slide along the top of the I-shaped rail of rack 20. Mounted for pivotal movement about a diameter between the top and the bottom portions of bracket 62 is a sleeve 82 through which cylindrical member 38 may move in an axial direction. Cylindrical member 38 is reinforced by the inclusion of a second coaxial tube 84. The axial movement of rod 38 within sleeve 82 is necessitated by the fact that the bracket 62 moves in a linear direction as a result of its attachment to rack 20 whereas the cylindrical member 38 pivots about point 32. Thus, as the bracket 62 is moved along the rail of rack 20, the radial distance between 32 and the bracket 62 is changed necessitating the allowance for axial movement of cylindrical member 38 within the sleeve 82.

THE CONVEYOR

As noted above, the conveyor mechanism for carrying trash from the pickup head, to be described in greater detail hereinafter, to the vehicle comprises two sections an upper section 6 which is supported at its lower end by the wheel 8 and its upper end by the cylindrical member 38 which extends across the top of the vehicle and is adapted to be pivoted about point 32.

The upper end of the upper portion of the conveyor has attached thereto a flexible guide means or boot 90 which permits relatively free movement of the conveyor whith respect to the vehicle and serves to channel the litter picked up to a hopper 92 beneath which is mounted a litter container of any convenient size or configuration.

The conveyor itself is of a generally open construction being closed on the two sides and the bottom with the framework 93 secured to the exterior thus presenting a smooth interior. The top of the conveyor is left open allowing immediate access for service, repairs or to remove foreign objects, should it become necessary. The upper portion 6 of the conveyor includes a cleated belt 98 driven by hydraulic motor 100.

The lower end of the conveyor mechanism is supported in a position such that the upper end of the lower portion 10 is located above the lower end of the upper portion 6, the details of this construction to be pointed out hereinafter. The lower portion 10 of the conveyor likewise includes the generally open frame construction including an open top, closed sidewalls and a conveyor belt 112 driven by hydraulic motor 114. It is to be noted that in the event that the vehicle is to be used in an area of high litter concentration or if the material to be removed is of such a nature that it would be impractical for the pickup head hereinafter described to handle, there is provided an optional backstop 116 located on the back side of lower portion 10 of the conveyor such that a person walking along the side of the truck may pitch the items into the conveyor from the side without undue risk to himself or excessive strain. The height of the backstop 116 is sufficient to present a reflective surface and the position on the conveyor would be relatively close to the bottom of the conveyor and thus close to the ground and readily accessible to a pedestrian. The structure of the conveyor is modified slightly at the position whereat the backstop will be mounted in that the upper portion of the conveyor at this point will be completely open, i.e., without cross bracing, to allow unobstructed access, without a great deal of accuracy required upon the part of the individual pitching the material.

The inside wall, i.e. the one which will be closest to the operator, of the lower end of the conveyor will include a portion covered by a rigid plexiglas 122 such that the operator may visually inspect the operation of the head from the control position. The ability of the operator to visually inspect without leaving his control position is, of course, time saving and assures that the head will continuously operate properly since malfunction will be immediately discovered.

THE PICKUP HEAD

Figure 6:
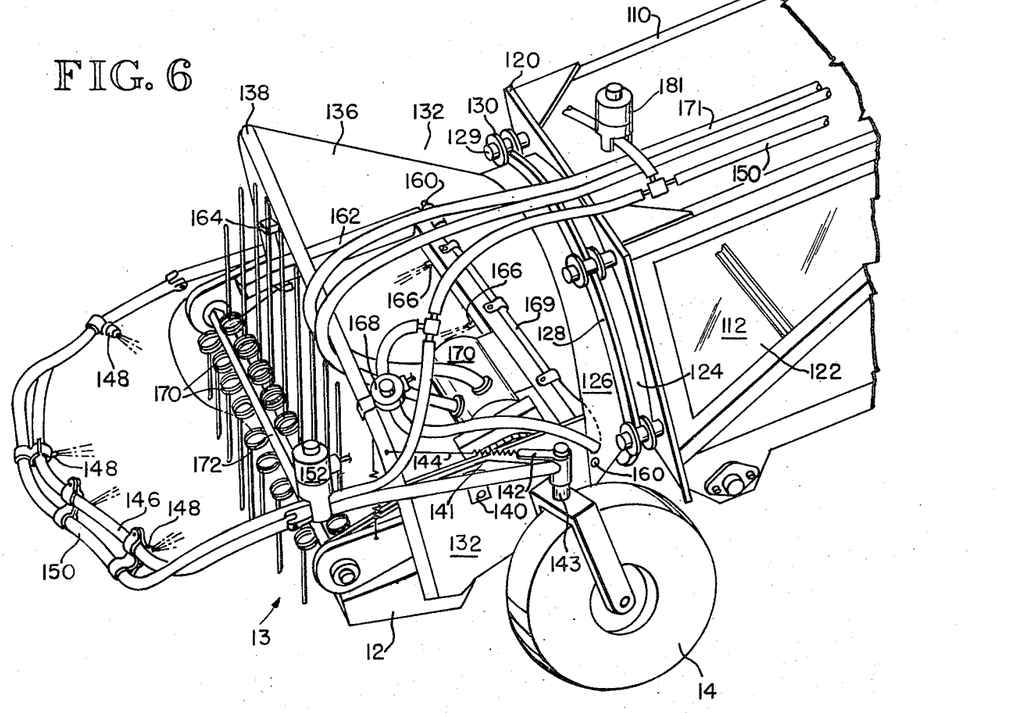
FIG. 6 is an enlarged perspective view of the pickup head.
Figure 7:
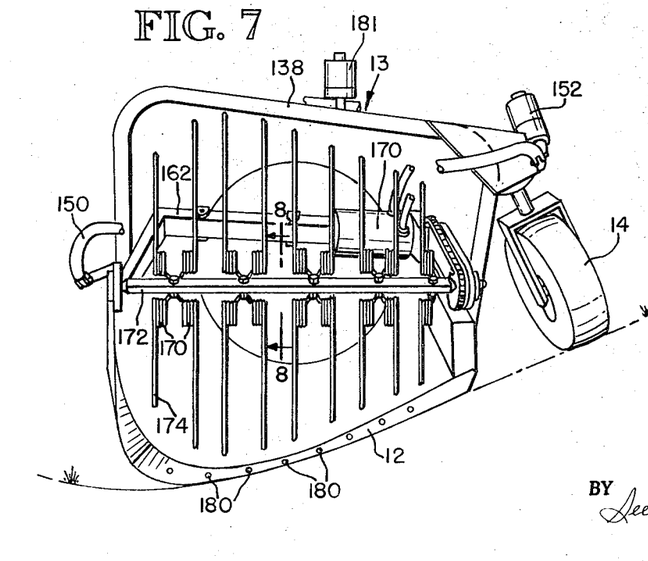
FIG. 7 is an elevational view of the pickup head of FIG. 6 as seen from the front.

As can be seen in FIGS. 6 and 7 the pickup head is mounted to the lower portion of the lower section 10 of the conveyor. The lower conveyor terminates in a generally square end plate 120 having a circular opening therethrough. The pickup head 12 has a rearwardly extending generally cylindrical neck portion 126 having secured thereto an outwardly projecting annular collar 128 and a further extending cylindrical neck 124 adapted to be telescopically received within the opening in the end plate 120. Mounted to the exterior surface of the end plate 120 is a plurality of outwardly projecting studs 129 having flanged rollers 130 mounted thereon. When the pickup head 12 is secured to the end of the conveyor system the collar 128 will be secured between the flanges of rollers 130 thus allowing relative rotary movement while preventing relative axial movement.

Because, as to be pointed out hereinafter, there are pneumatic hoses which are secured to both the conveyor mechanism and the pickup head and because it is desirable to have the head normally contact the supporting surface with the same side down the relative rotation between the head and the conveyor will be limited by appropriate stop means.

Extending forwardly from neck portion 126 is the bottom member 132 of the head 13 which has a generally U-shaped main body portion and terminates at the forward end with a skid 12 adapted to ride upon the ground during operation. The leading edge of the skid 12 while tapering to a knife like surface is contoured and not flat. The contoured edge has been found to be the most acceptable in that it tends to channel the litter into the pickup tines, described hereinafter, and further it has been found to be most readily adaptable upon the variety of surfaces upon which the head will be expected to operate.

Enclosing the upper portion of the pickup head is a plexiglas, funnel shaped cover member 136 secured to the neck 126 at one end and to a framework 138 at the other end, thus forming a tunnel-like enclosure which is larger at its forward end than at its after end with the framework 138 serving as its leading edge. The purpose for the plexiglas shield is, firstly to channel the litter picked up by the pickup head and secondly to allow visual inspection of the operation of the pickup mechanism by the operator.

Wheel 14 is mounted to the head and is of the freely rotating caster type. The wheel is mounted to a pickup head by means of bracket 140 having legs 141 having a triangular rigid configuration secured to the side of the pickup head 13 itself. A lever 142 is secured to the upper end of the rotatable shaft 143 upon which wheel 14 is mounted. A spring 144 extends between the lever 142 and the framework 138 and continuously urges the wheel 14 to a generally fowardly orientation, a direction that it will normally assume when in operation.

Secured to the bracket 140 is a tubular framework 146 which extends forwardly from the journal for the wheel 14 and extends around the front of the pickup head at a distance forwardly thereof. Mounted to the framework 146 are a plurality of nozzles 148 to which air is supplied by hose 150 the flow of which is controlled by solenoid valve 152 operable from within the cab of the supporting vehicle. Thus, the operator is able to exert a rearwardly directed blast of air upon any object lodged within the head and move it through the neck onto the conveyor, clearing the head of obstruction without leaving the cab.

Mounted inside the pickup head itself is the actual litter pickup mechanism which makes the device one of universal applicability. The pickup mechanism is secured at its aft end to the interior of the head 13 by pivots 160 secured to the back of the spaced U-shaped framework 162 which opens towards the front of the pickup head. To prevent damage to the interior of the head, the framework 162 is restricted in pivotal motion by means of stops 164 located upon the frame 138 which forms the upper leading edge of the head 13 preventing excessive swing of the mechanism. Mounted to the back of the U-shaped frame 162 are a plurality of nozzles 166 controlled by solenoid valve 168 and having air supplied by hose 169. Nozzles 166 are directed forwardly and function oppositely to nozzles 148 thus blasting material out of the head.

Figure 8:
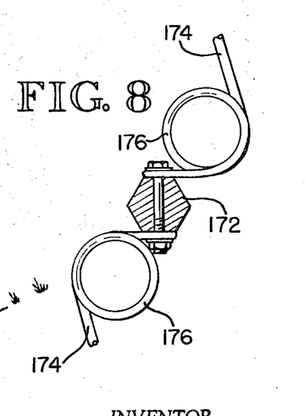
FIG. 8 is an enlarged section through the pickup element of the head showing the means of attachment of the members.

Mounted to the back portion of the frame 162 is a bracket supporting hydraulic motor 170 which has fluid supplied through hoses 171. Hydraulic motor 170 is drivingly connected to rotatable shaft 172 at the forward end of the U-shaped frame 162. Secured to rotating shaft 172 (See FIG. 8) are a plurality of prongs or tines 174 which are made of spring steel and include as an integral part of each tine a plurality of loops 176 to increase the flexibility. The use of spring steel allows the tines 174 to return to their original shape and yet yield without breakage when in contact with a solid object.

It is to be noted that, as seen in FIGS. 6 and 7, the lower portion of the pickup head 13, formed by skid 12 has a forwardly extending lip portion which is of irregular configuration which has empirically proven to be the shape which is most efficient for picking up litter in a variety of terrains. It is also to be noted that the prongs 174 are of the irregular length to conform to the configuration of the lower portion 12 of the head 13 thereby providing a complete sweeping action of anything captured by the head. It may be noted further with reference to FIG. 3 (lower right portion), as well as FIG. 6, that the axis of the rotatable shaft 172 carrying the tines 174 is angularly disposed to the direction of motion of the pickup head as the vehicle advances along its path, whereby the disposition of the shaft 172 conforms roughly in plan view to the disposition of the forward edge of the lower portion of the head as seen in FIG. 3; in fact, (referring also to FIG. 7) the shaft is seen in both elevation and plan views to be angularly disposed to the (generally horizontal) ground surface contacted by the skid or base member 12 and also to a plane normal to the predetermined path of the vehicle.

In operation, as the vehicle moves forwardly with wheel 14 and skid 12 in contact with the supporting surface litter is scooped by a combination of the forward movement of the head with the ground contacting skid 12 and the rearward motion of the lower part of the pickup tines 174 which kick the material onto the belt. Litter picked up is kicked rearwardly by the tines through the opening in plate 120 to rest upon the conveyor belt 112 at which point the litter will be carried up to the van as described hereinabove.

The lower portion of the pickup head is designed such that in normal operation both the bottom of the skid 12 and the wheel 14 are in contact with the ground. When the head is in this position, the contoured leading edge of the head has the outwardly extending scooped portion generally lower than the remainder of the leading edge. With the head in this position, the litter contacted by the leading edge tends to be corralled by the curvature defining the contoured profile. To assure that the tines 174 fully sweep the interior of the head the axis of the shaft 172 is at an angle to the line drawn between the bottom of the wheel 14 and the leading edge of the skid in addition to the varying length of the tines themselves.

In the event that the pickup head is scraping so close to the ground that it picks up a plurality of rocks or the like the operator simply actuates solenoid 168 sending the jet of air through nozzles 166 and blasting the unwanted material off the top portion of skid 12. In the event that a piece of rag or paper becomes embedded upon the tines or starts wrapping around the rotating shaft 172 the operator actuates solenoid 152 sending a blast of air through nozzles 148 and blowing the object rearwardly to rest upon conveyor 112.

Figure 9:
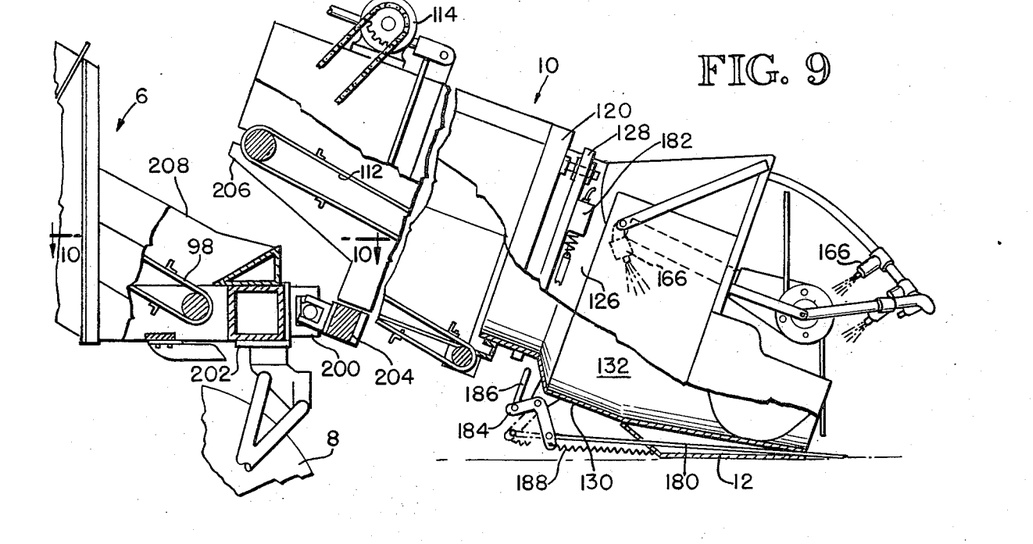
FIG. 9 is a side view of the pickup mechanism with elements foreshortened for clarity.

A problem has been encountered in the fact that many times the litter to be removed will have been in place along the side of the road for some time and have become partially embedded within the dirt or sand. The mechanism as hereinabove described as a result of the skid type leading edge will have a tendency to bounce over an object which is in a substantially buried condition. A plurality of spring biased, retractable, forwardly extending prongs 180 are mounted to the lowermost portion 134 of the head 12 and adapted to be retracted to a position within the skid. As can be seen in FIG. 9, the prongs 180, when in their retracted position, do not effect the leading edge of the skid.

The normal operating position for the prongs is the extended condition where they will serve to rake partially buried material from the terrain. The prongs are spring loaded to the extended position as hereinafter described and thus will yield without damage when contact is made with a solid object. In the event that the prongs become entangled in weeds or in the event that for a particular combination of terrain and/or litter the head will operate most effectively with a smooth edge, cylinder 180 is actuated by solenoid 181 retracting the prongs. As described in detail hereinafter with reference to the circuitry, the prongs may be retracted as a simple operation or alternatively may be retracted while being subjected to a blast of air from nozzles 166 for a rapid and thorough cleaning operation. The operative linkage for the retraction of prongs 180 is an L-shaped link 181 pivotally mounted to the head and connected directly to air cylinder shaft 186. The other end of link 184 is secured directly to the rearward portion of the prongs 180. The prongs are urged to their forwardmost position by means of a spring 188 secured to the bottom portion of linkage 184 and to the inside bottom portion of the skid 134. The mounting of the prongs 180 allows them to yield without breakage in the event that contact is made with a solid object.

ARTICULATION MEANS

As seen in FIGS. 9 and 10, the connection between the lower conveyor section 10 and the upper conveyor section 6 is through universal joint 51 rigidly secured to the wheel supporting framework 202 of conveyor section 6 and to a cross piece 204 of lower section 10. The joint 51 allows relative vertical and horizontal movement and yet will not allow relative rotational movement assuring that the conveyor is always in an upright condition for most efficient operation of the conveyor belts. The rearward portion 206 of the section 10 extends over the forward portion 108 of section 6 thus assuring the litter will be transferred from one section to the other without spillage. Referring specifically to FIG. 10 the forwardly and upwardly extending lip 208 of section 6 has a leading edge generally normal to the movement of the belt 98 where as framework 202 is at an angle thereto since in normal operation the upper section 6 will extend outwardly at an angle to the movement of the vehicle and the lower section 10 will tend to be parallel thereto. The placement of the frame member 204 transfers the forces generated by movement of the head 12 along the ground in a straight line through the universal joint 51 thus lessening the possibility of failure.

Referring to FIG. 11, the conveyor can be seen in cross section and it can be seen that belt 98 moved above a plurality of struts 210 joining sidewalls 212 which are further reinforced by frame members 214, 216 and 218. The litter is confined to belt 98 by means of curved skirts 220 which eliminate the possibility of litter lodging in the corners of the section and continuously urge litter onto the moving belt.

The mechanism hereinabove described is not limited to use upon the ground but as seen in FIG. 12 the addition of floats 230 allow the mechanism to pick up litter floating upon water such as litter within a harbor or the like used to absorb oil spills.

OPERATION

Figure 13:
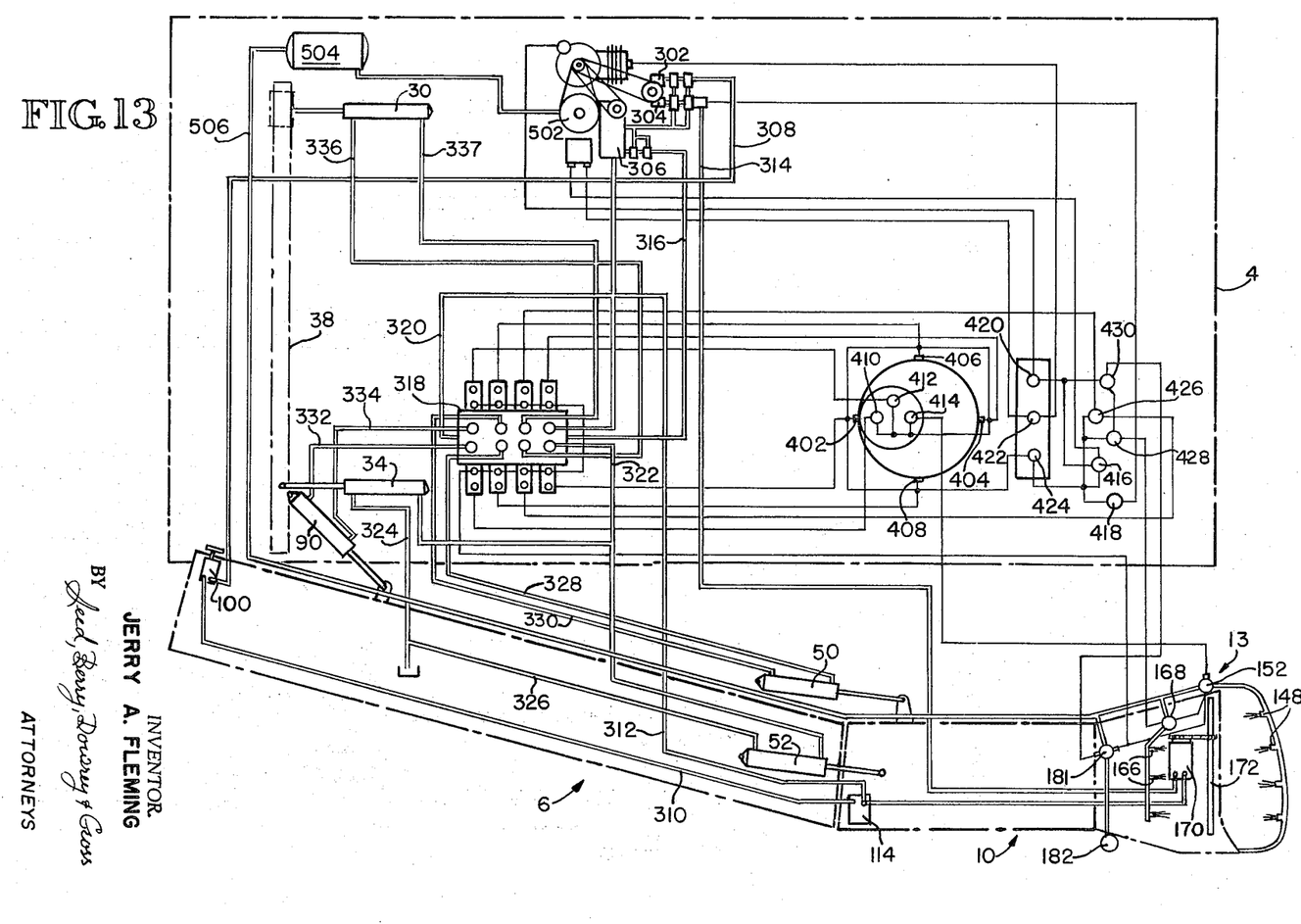
FIG. 13 is a schematic view of the control system for the pickup mechanism.

The operation of the hereinabove described mechanism will now be detailed with reference to FIG. 13 which schematically shows the necessary plumbing and electrical wiring for operation of the mechanism. For purposes of clarity, the hydraulic system will be described using reference numerals in the 300 series, the electrical system will be described using reference numerals in the 400 series and the pneumatics will be described with reference numbers in the 500 series. It will be understood that the functions are interdependent so complete segregation is not possible. The mechanism is controlled by a master control console immediately surrounding a modified joy or control stick with some of the controls mounted to the dash panel in front of the driver of the vehicle. Power for the various operating entities is provided by an auxiliary motor mounted within the vehicle and which drives hydraulic pumps 302, 304 and 306 as well as compressor 502, the function of which is detailed hereinafter.

Referring with particularity to the hydraulic system, it can be seen that pump 302 forces fluid through line 308 to drive hydraulic motor 100 which is located at the upper portion of conveyor 6. The fluid propelled by pump 302 passes through motor 100 and then continues through line 310 to the hydraulic motor 114 so mounted upon the upper part of the lower portion 10 of the conveyor system. It will be recalled that the hydraulic motors 100 and 114 drive the conveyor belts which serve to carry the litter from the head 13 to the position where it is dumped within the vehicle. The fluid which has been pumped through the hydraulic motors 100 and 114 is returned through line 312 to be recirculated. Pump 302 feeds through a flow control valve such that the operator may regulate the speed of the belts by adjusting the valve. The use of the same pump to drive the motors which in turn drive the conveyor belts reduces the amount of connecting conduits necessary upon the conveyor assembly and further, assumes that the belt be driven at the same speed preventing the bottleneck which would occur in the event the lower belt were to move at a more rapid rate than the upper belt.

Pump 304 feeds through a remote controlled variable flow valve such that the operator may regulate the flow from the control console as described hereinafter. Pump 304 forces fluid through line 314 to hydraulic motor 170 which controls the speed at which the tines 172 within the pickup head 13 are rotated. The fluid after circulating through motor 170 is returned through line 312 which, as noted above, is the return line for the fluid which passes through motors 100 and 114 driving the conveyor belts.

Pump 306 serves as a source of fluid pressure for the various hydraulic cylinders and the fluid is pumped through line 316 to a solenoid operated control bank 318 through which, at the direction of the operator, the various cylinders are operated. When none of the cylinders are in operation fluid pumped through line 316 will exit through line 320 and thus go back to pump 306. To operate cylinders 34 and 52, which are in series, the fluid is directed through line 322 directly to the above noted cylinders. It is further to be noted that cylinders 34 and 52 are both single action cylinders vented to the atmosphere through lines 324 and 326. It will be recalled that cylinders 34 and 52 control the relative height of the conveyor. It will further be recalled that when the conveyor system is lowered, the weight of the conveyor is the moving force. The downward movement causes the cylinder 34 to force fluid into line 322 and into cylinder 52 raising the front end of the conveyor. This movement, as noted hereinabove prevents the forward end of the conveyor from contacting the ground prior to the wheel 8 at the lower end of section 6 contacting the ground.

Double acting cylinder 50 controls inward and outward movement of the lower portion 10 of the conveyor receives fluid for outward movement through line 330 and for inward movement through line 328. Double acting cylinder 90 controls inward the outward movement of the entire conveyor by moving the upper portion of the conveyor 6 inwardly and outwardly and receives fluid for moving the conveyor outwardly through line 332 and for inward movement through line 334.

Cylinder 30 controls the movement of the entire conveyor for placing the unit upon or taking it off the top of the carrying vehicle receives the fluid for outward movement through line 336 and for inward movement through line 338. When the mechanism is transported to the desired location for operation the litter pickup mechanism is carried upon the top of the vehicle. Upon arriving at the destination the operator actuates the solenoid valve which directs fluid through line 322 raising the entire mechanism off the top of the vehicle. The operator then activates the solenoid valve which directs fluid through line 336 moving the conveyor outwardly of the vehicle such that it may be lowered to the ground without contacting the vehicle. The mechanism is so designed that when the cylinder 30 is retained at full stroke the conveyor is prevented from swinging inwardly by the other controls to a position where it would contact the vehicle. Upon reaching the outwardmost position available through the actuation of cylinder 30, cylinder 34 is vented allowing the weight of the conveyor to lower it to the ground which as described above causes the cylinder 52 to raise the forward portion 10 of the conveyor upwardly so that it will not contact the ground prior to the upper portion 6 of the conveyor reaching the ground. Control of the position of the conveyor during litter picking operation is handled by double acting cylinders 90 and 50 performing their normal functions. To return the conveyor to the top of the vehicle the above mentioned sequence of operations is reversed, i.e., the conveyor is raised and then brought inboard.

Referring now to the electrical control system, the main control for the conveyor is, as noted hereinabove, the modified joy stick of an airplane which has four micro-switches which are operated by movement of the joy stick in either the forward, aft, left or right hand directions. Rearward movement of the joy stick contacts microswitch 402 connected to the solenoid operated valve which actuates cylinder 34 raising the entire conveyor. Forward movement of the joy stick contacts microswitch 404 which vents the system allowing the entire conveyor to be lowered. Leftward movement of the joy stick contacts microswitch 406 which actuates cylinder 50 moving the lower portion 10 of the conveyor to the left and rightward movement of the joy stick contacts microswitch 408 which causes outward or rightward movement of the lower portion of the conveyor. The button located upon the top of the joy stick actuates switch 410 connected to the solenoid operated bank valve actuating cylinder 90 causing the main conveyor to move to the right whereas the switch on the lefthand side of the joy stick 412 causes the main conveyor to move to the left by actuating the same cylinder. The trigger mechanism normally located at the front of the joy stick actuates switch 414 connected to solenoid 152 which creates a blast of air which, as described above, forces the material within the conveyor head rearwardly onto the conveyor itself.

A master switch 416 is mounted upon the control or instrument panel of the vehicle which controls the entire electrical system and would preferably be key operated. Similarly upon the control panel there is provided a variable speed dial 418 for controlling the variable speed valve 304 which in turn controls the speed of motor 170 by regulating the flow thereto. Directly connected to the master switch 416 and mounted upon the control panel is the starter switch 420 for remotely starting the power plant which drives the hydraulic pumps as well as the compressor. For safety reasons, a second switch 422 is provided which turns the power plant motor on or off thus allowing the operator to instantly terminate all power and all functions. Similarly, for safety reasons there is a master switch 424 upon the instrument panel which controls conveyor movement whereby the operator may terminate or kill conveyor movement by deenergizing the circuit which controls the movement and leave the truck but allow the pickup tines and/or belts to remain in motion. Switch 426 is likewise mounted upon the dash and controls the hydraulic cylinder 30 which is primarily used for loading and unloading and includes a leftward position and a neutral position and a right position. The remaining switches are 428 which actuate solenoid 168 to prevent a blast of air to exhaust the pickup head and toggle switch 430 which is a three-way switch including neutral position wherein the cylinder 182 is released and the prongs 180 are in their normally extended position. Flipping the toggle in one direction actuates solenoid 181 retracting the prongs 180 and at the same time actuating solenoid 168 which gives a blast of exhaust air cleaning the prongs.

As noted above the power plant drives compressor 502 in the pneumatic system which likewise includes storage tanks 504 and air line 506 which supplies air to retract the prongs through actuation of solenoid 181 and air cylinder 182. Air line 506 likewise provides the air for the exhaust blast through nozzles 166 and the intake blast through nozzles 148.

SUMMARY

As can readily be seen the combination of a mobile vehicle with the litter pickup mechanism hereinabove described allows one operator to pick up a great deal of the litter scattered along the highway and further able to move from place to place at a rapid rate of speed. The preferred embodiment comprises a standard van converted to a right hand drive on which is mounted the boom and pickup device. The device is completely controlled and powered by hydraulics. Lateral and vertical control of the pickup and conveyor devices is by means of a pedestal mounted control on the dash directly in front of the operator. The control closely resembles a shortened joy stick of an airplane and is operated in much the same manner. Actual control is by means of microswitches and solenoid operated hydraulic valves. All other switches and controls are mounted conveniently around the control pedestal within easy reach of the operator.

Pick up of litter is accomplished both by means of the steel fingers or tines powered by a hydraulic motor and rotating much in the manner of a standard rotating brush. The pickup head itself moves within reasonable limits independently of the chute to which it is attached thus allowing operation upon a variety of terrains. The pickup head is mounted to a short conveyor belt and there is also a conveyor belt in the main chute. The pickup head itself is rimmed with airblast devices which blow the litter back onto the conveyor, the velocity of the airblast is increased by the employment of aerodynamics in the structure of the tunnel. The pickup head is self leveling and is interchangeable for different types of application. It will be evident that adaptation of the same equipment would permit it to be used for cleanup jobs in many situations other than along roadways and that the same machine has been designed so that it may be easily adapted to a boat or barge by means of using pontoon flotation other than tires.

The embodiments of the invention in which a particular property or privilege is claimed are defined as follows:

1. A mechanism for gathering litter from a supporting surface, comprising:
    a vehicle adapted to move in a path traversing a nearby surface;
    elongated material-transporting means mounted at its inner end to the vehicle and adapted for motion of its outer end vertically and also laterally of said path, including conveyor means for moving litter inwardly therealong for disposal;
    litter pickup means secured to the outer end of said material-transporting means, adapted to pick up litter from said supporting surface and deliver it to said conveyor means while the vehicle is moving;

and control means for effecting said lateral and vertical motions of the material-transporting means to place said litter pickup means alongside the vehicle in the vicinity of litter to be gathered.

2. The litter-gathering mechanism of claim 1, in which the vehicle includes a litter-containing receptacle, and the conveyor means is disposed to deliver litter inwardly into said receptacle.

3. The litter-gathering mechanism of claim 1, in which the vehicle is mounted on wheels.

4. The litter-gathering mechanism of claim 1, wherein the pickup means is mounted for pivotal motion relative to the material-transporting means.

5. The mechanism as in claim 1 wherein the conveyor means and litter pickup means are movable as a unit from a position alongside the vehicle to a self storing position on top of the vehicle.

6. The mechanism as in claim 1 wherein said pickup means includes rotary means for moving the litter from said supporting surface to the conveyor means.

7. The mechanism as in claim 6 wherein the rotary means is a powered shaft having a plurality of tines mounted thereon.

8. The mechanism as in claim 7 wherein said pickup means has upper and lower enclosing surfaces, and said rotary means is disposed between said surfaces and carries a plurality of radial tines for sweeping the enclosed space therebetween.

9. The mechanism as in claim 7 wherein the pickup means has non-parallel upper and lower enclosing surfaces, and said tines are of spring steel and of varying lengths to conform generally to the inner contour defined by said upper and lower surfaces.

10. The litter-gathering mechanism of claim 1, in which said material-transporting means includes
an elongated inner transport section pivotally affixed at its inner end to the vehicle for lateral and vertical motion of its outer end,
an elongated outer transport section pivotally affixed at its inner end to the outer end of said inner transport section for relative lateral and vertical motion of the outer end of the outer transport section,
inner conveyor means disposed along the inner transport section for moving litter inwardly therealong for disposal,
and outer conveyor means disposed along the outer transport section for moving litter inwardly therealong to said inner conveyor means,
said litter pickup means being secured to the outer end of said outer transport section for picking up litter and delivering it to said outer conveyor means,
and said control means being adapted to effect said lateral and vertical motions of said inner and outer transport sections.

11. The litter-gathering mechanism of claim 10, in which said material-transporting means includes support means carried near the outer end of the inner transport section and disposed therebelow for riding on said supporting surface during use.

12. The litter-gathering mechanism of claim 10, in which said litter pickup means has a bottom portion adapted to contact and follow the contours of the supporting surface, an upper closed portion adapted to confine litter articles picked up, an open face portion adapted to receive the litter articles, an open rear portion adapted for discharging articles so received to the outer conveyor means, and rotating means in said upper closed portion adjacent said open face portion for moving articles from the front to the rear thereof.

13. The litter-gathering mechanism of claim 12, in which said litter pickup means includes a ground-contacting wheel, and is rotatable about an axis roughly longitudinal of said outer transport section, whereby the bottom portion thereof is free to conform to the lateral contour of the supporting surface.

14. A pickup head adapted for use at the outboard end of a boom having a bottom portion adapted to contact and follow the coutours of the supporting surface, an upper closed portion adapted to contain anything picked up by the head, an open face portion adapted to receive the material to be picked up, an open rear portion adapted to serve as the discharge means for objects picked up, means attached to the head to receive items passed through the rear portion thereof, means within the head for moving items from the front to the rear thereof whereby objects contacted by the head will be automatically moved out the rear opening therein, and nozzle means disposed adajcent to the head whereby material within the head may be moved out of the head either forwardly or rearwardly by a selected blast of pressurized fluid.

15. A pickup head as in claim 14 and further including a plurality of retractable prongs adapted to rake the surface jarring imbedded objects loose to enable removal thereof.

16. A pickup head as in claim 15 wherein the prongs are biased outwardly and project from the leading edge of the lower surface of said head.

17. A vehicle mounted mechanism for removing litter from the vehicle supporting surface comprising;
means for mounting the mechanism to the vehicle including a shaft extending transversely of the normal direction of travel of the vehicle being pivotable about a vertical axis at one side of the vehicle and mounted for movement generally parallel to the direction of travel of the vehicle at the other side of the vehicle said shaft extending beyond the side of the vehicle adjacent the pivot point,
powered material transporting means having a first end secured for movement about a horizontal axis to the extended end of the shaft and a second section joined by a universal joint to the outboard end of the first section whereby it may move in a horizontal and vertical direction but will remain horizontally disposed,
fluid cylinders under the control of the operator adapted to move the material transporting means through its range of possible combinations,
a pickup head mounted to the outboard end of the second section of the material transporting means, said pickup head adapted to travel upon the supporting surface and including a bottom portion adapted to rest upon the ground, the leading edge of the bottom portion adapted to capture litter as the vehicle moves and includes a forwardly projecting lip on the side away from the vehicle acting as a scoop, a powered shaft mounted within the head having a plurality of flexible members of varying length secured thereto to sweep the interior surface of the head in a rearwardly direction, a passage at the rear of the head allowing articles captured by the head and swept by the flexible members to be deposited upon the second section of the material transporting means and thereafter be carried to the vehicle whereby the vehicle can traverse the surface and the litter contacted and captured will be automatically transported to the vehicle.

18. An enclosed litter pickup head adapted to be moved in a predetermined path with respect to a litter-bearing surface, comprising;
 a base member for contacting the littered surface having a contoured leading edge for scooping the litter into the head,
 a cover member adapted to enclose the upper portion of the head and forming a tunnel-like enclosure which is larger at its forward end than at its after end,
 a powered sweeping means mounted in the forward end of the head upon a shaft which is rotated about an axis angularly disposed to said surface contacted by the base member and also to a plane normal to said predetermined path,
 a plurality of nozzles surrounding the sweeping means whereby objects impaled upon the sweeping means may be removed by fluid under pressure and objects inadvertently captured may be removed by fluid under prussure, and
 a plurality of extensible elements mounted in the leading edge of the base member whereby objects which are partially embedded may be jarred loose and picked up.

* * * * *